United States Patent [19]

Spence-Bate

[11] 3,989,375

[45] Nov. 2, 1976

[54] PHOTOGRAPHIC COPYING APPARATUS

[76] Inventor: Harry Arthur Hele Spence-Bate, 115 Cheam Place, Morley, Australia, 6062

[22] Filed: Feb. 12, 1975

[21] Appl. No.: 549,369

[52] U.S. Cl. ............................................. 355/70
[51] Int. Cl.² ..................................... G03B 27/54
[58] Field of Search ...................... 355/8, 37, 67, 70

[56]  References Cited
UNITED STATES PATENTS

| | | | |
|---|---|---|---|
| 3,539,258 | 11/1970 | Miles | 355/70 |
| 3,716,298 | 2/1973 | Reardon | 355/70 X |
| 3,836,251 | 9/1974 | Hertel et al. | 355/70 |
| 3,892,482 | 7/1975 | Weisglass | 355/71 X |

Primary Examiner—Richard A. Wintercorn
Attorney, Agent, or Firm—Fidelman, Wolffe & Waldron

[57] ABSTRACT

An apparatus for photocopying a document on a surface including a camera having a lens directed at the surface and a pair of illumination housings adjacent opposite edges of the surface for illuminating the surface with diffused light. The illumination housings are of sufficient height to reduce the amount of external light which shines on the surface.

9 Claims, 2 Drawing Figures

PHOTOGRAPHIC COPYING APPARATUS

BACKGROUND OF THE INVENTION

1. Field of the Invention

The present invention relates generally to photocopying machines and more specifically to a photocopying machine with an improved source of illumination.

2. Description of the Prior Art

Photocopying machines of the kind where documents are laid on a copying surface normally require the documents to be illuminated. An example of such a machine is a microfiche camera.

Known microfiche cameras have illumination provided from lamps carried on arms so as to be at some distance from the copying surface. The lamps have to be positioned in relation to the copying surface so that light from the lamps is not regularly reflected by the document being copied into the camera lens. At the same time, it is also desirable to have illumination as near to the normal of the copying surface as is possible. These two requirements result in practice in the incident light from the lamps being at an angle of around 45° to the copying surface.

If the lamps are set too close to the document, the distance from the lamp to one edge of the document is considerably different to the distance to the other edge. Thus, the light intensity varies over the width of the document. To obviate this disadvantage, the lamps are set as far as practical from the document, thus ensuring as even an intensity over the surface of the document as possible. The disadvantage in this case is that the copying machine becomes cumbersome and the lamps on their arms are vulnerable to damage.

If the light from the lamps is required to be filtered, each lamp would have to be provided with a filter to overcome the disadvantages and to provide a more convenient lighting arrangement.

SUMMARY OF THE INVENTION

The present invention consists of photocopying apparatus having a surface for the reception of a document to be copied, a camera with a lens directed towards the said surface and at least one illumination housing containing at least one light source, and having a window adjacent one edge of the surface by which the surface is illuminated by light from the source. The housing also containing diffusion means distinct from the light source and is so arranged that substantially no undiffused light from the source is reflected from the surface into the lens.

A second illumination housing may be provided at an edge of the surface opposite the other housing to provide additional diffused light. Both of the illumination housings are of sufficient height relative to their distance of separations to reduce the amount of exterior light which shines on the surface. The camera housing may also be of sufficient dimension to rest on both of the housings and further reduce the amount of exterior light which shines on the surface.

OBJECTS OF THE INVENTION

An object of the present invention is to provide an improved illumination source for a photocopying apparatus.

Another object is the provision of an illumination source which evenly illuminates the document to be copied.

A further object of the invention is to provide an illumination housing which is not cumbersome or vulnerable to damage or misalignment.

Still another object is to provide a photocopying apparatus which reduces the amount of exterior light which shines on the document to be copied.

A still further object is to provide a versatile source of diffused light in a photocopying apparatus.

Other objects, advantages and novel features of the present invention will become apparent from the following detailed description of the invention when considered in conjunction with the accompanying drawings.

DESCRIPTION OF THE PREFERRED EMBODIMENTS

Figure 1:
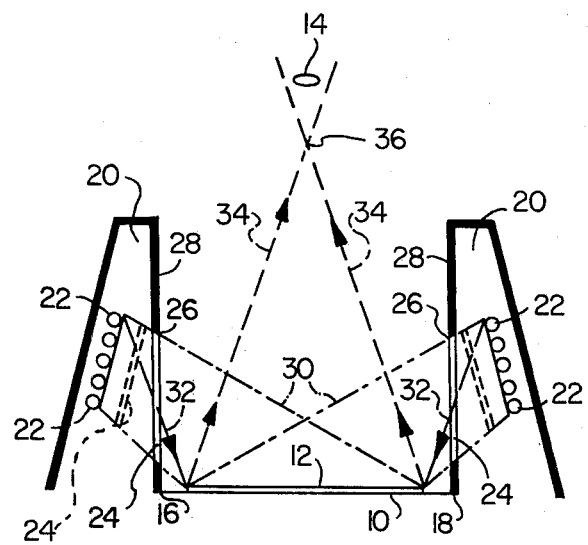
FIG. 1 shows a preferred embodiment of an illumination housing in a photocopying machine according to the present invention.

FIG. 1, which depicts a preferred embodiment of the photocopying apparatus, shows a copying surface 10 for a document 12. A camera, represented by a lens 14 for sake of clarity, is above surface 10 having lens 14 directed down at the surface 10. Adjacent edges 16 and 18 of surface 10 are a pair of illumination housings 20.

In each illumination housing 20, there are five or six fluorescent lamps 22. These lamps are arranged behind a ground glass or graduated screen or like translucent diffuser 24, which is mounted in window 26 of wall 28 of the illumination housing 20. An alternative position for the diffuser 24 is shown in phantom. As may be seen from FIG. 1, the light from the lamps 22 follows the broken lines 30 and 32 and is reflected off the document 12 as indicated by broken lines 34 which intersect at a point 36 below the lens 14. Thus no undiffused light is directed onto the document 12 and, hence, through the lens 14.

Figure 2:
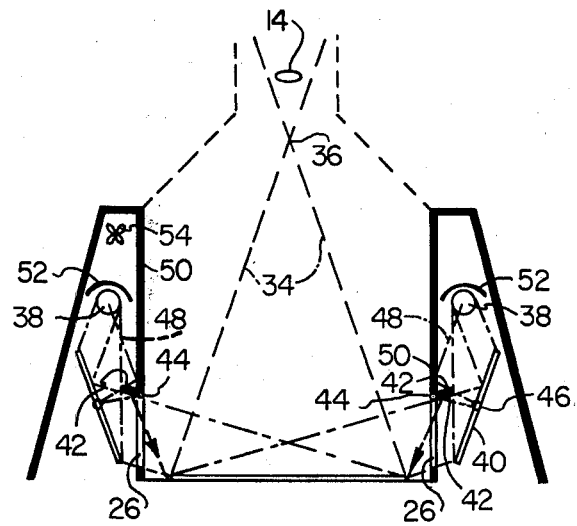
FIG. 2 depicts a further preferred embodiment of an illumination housing in a photocopying machine according to the present invention.

A further embodiment of the invention is shown in FIG. 2. In this embodiment, the distance from the light source to the document has been lengthened by locating lamps 38 at the top of the lamp housings 20 and reflecting the light by mirrors, one of which is shown at 40.

In order to provide more diffused light, a diffuser 42 comprising a sheet of aluminum is fitted above the light window 26 emerging. Both the diffuser 42 and the mirror 40 can be pivoted in order to provide adjustment when setting up the machine in the factory, the diffuser being pivoted about the point 44, and the mirror about the point 46. A stray light path 48 is shown which is reflected off the internal plating of the housing at 50, thence to a mirror 40 where it is thrown onto the diffuser 42 and projected down again towards the copying surface 10. This shows a part of the function of the diffuser in its role of evening the light out in the copying area. The eveness of the light obtained is an important feature of the arrangement. It has been found to be advantages to advantageous a mercury vapour lamp in order to get a more intense light. The lamp 38 is one of two in each illumination housing; this results in a more directional light than the arrangement of FIG. 1. Optionally, a reflector 52 can be fitted in the housing about the lamps 38. Besides directing the light downward, it acts as a heat reflector.

A further advantage of the arrangements shown in FIGS. 1 and 2 is that the illumination housings 20 provide a screen, so that the amount of exterior lighting from around the photocopying apparatus which can shine on the document is reduced. The height of the illumination housing 20 is selected depending upon the distance of separation of the housing (from edge 16 to edge 18) so as to reduce the amount of exterior light. The intense light from the mercury vapour lamp of the embodiment shown in FIG. 2 provides such intense light that it overcomes exterior lighting. Further reduction of exterior light can be achieved by shaping the head of the camera with wings (as shown in phantom in FIG. 2) or any other device. Thus, the document is virtually enclosed within a box open only at its front.

Suitable cooling arrangements, such as a small fan 54 or ducting from an outside source, may be provided to cool the lamp housings.

Shutters can be temporarily employed for such purposes as indicating on the document by light positioning means the frame or area which the lens will photograph.

If it is required to move the lens 14 nearer the copying surface 10 than the intersection point 36, it is necessary to reduce the light window aperture by imposing a cut-off shutter or the like along the top edge of the window.

It must be appreciated that the boundaries of light as delineated by the broken lines of FIGS. 1 and 2 are not such that stray and random reflections off the body work of copying apparatus do not stray outside these boundaries.

From the preceding description of the preferred embodiments, it is evident that the objects of the invention are attained and, although the invention has been described and illustrated in detail, it is to be clearly understood that the same is by way of illustration and example only and is not to be taken by way of limitation. The spirit and scope of this invention are limited only by the terms of the appended claims.

What is claimed is:

1. A photocopying apparatus comprising:
   a surface for receiving a document to be copied;
   a camera with a lens directed towards said surface;
   an illumination housing adjacent a first edge of said surface, said illumination housing including a deflector;
   a window in a wall of said housing at said first edge of said surface;
   a source of light in said housing; and
   diffusion means in said housing distinct from said light source for diffusing substantially all the light from said light source that is reflected from said surface into said lens, said diffusion means including a plate extending from an edge of said window into said housing whereby light is directed from said source to said reflector to said diffusion means through said window.

2. The apparatus of claim 1 wherein said diffusion means is a ground glass screen.

3. The apparatus of claim 1 including a second illumination housing adjacent a second edge of said surface opposite said first edge, a window, a light source and a diffusion means in said second housing.

4. The apparatus of claim 3 wherein said illumination housings are of sufficient height compared to the distance of separation of said housings to reduce the amount of exterior light which shines on said surface.

5. The apparatus of claim 4 wherein said camera includes a pair of wings, each of which rests on one of said illumination housings to substantially reduce the amount of exterior light which shines on said surface.

6. The apparatus of claim 4 wherein said wall of both of said illumination housings is substantially perpendicular to said surface and said wall has a length at least equal to said edge.

7. The apparatus of claim 1 including a fan in said illumination housing.

8. The apparatus of claim 1 wherein said source of light is a mercury vapour lamp.

9. The apparatus of claim 1 wherein said plate is pivotally mounted to said housing and said reflector is adjustably mounted to said housing.

* * * * *